Dec. 14, 1965

G. ARENA  3,223,817
TORCH FOR ARC-OXYGEN UNDERWATER CUTTING AND WELDING
Filed May 17, 1963

INVENTOR
GUIDO ARENA

United States Patent Office 3,223,817
Patented Dec. 14, 1965

3,223,817
TORCH FOR ARC-OXYGEN UNDERWATER
CUTTING AND WELDING
Guido Arena, 120 Via della Balduina, Rome, Italy
Filed May 17, 1963, Ser. No. 281,155
4 Claims. (Cl. 219—70)

The present day technique for underwater cutting and welding has developed over some considerable time owing to the fact that this method is ever more widely used on account of the necessity of laying out and working underwater, which necessity is always increasing.

This invention concerns an arc-oxygen torch as it is only by using electric power that it is possible to effect cuttings and weldings of a certain consistency, while if an oxy-hydrogen blowpipe is used it is only possible to operate on minimal thicknesses, i.e. up to a maximum of a few millimetres.

The main problem in relation to the use of the arc-oxygen torch is that of obtaining an oxygen seal on the electrode.

Generally speaking it has been thought a good idea to provide special electrodes complete with screw threads.

The use of these screw threaded electrodes brings about considerably increased costs when the torch is used for underwater work. It is also more difficult for the underwater operator to use the torch. Actually the use of the screw threaded attachment makes it necessary to use metallic electrodes which, among other disadvantages, have that of welding easily to the part to be cut unless the operator is highly skilled and has much experience.

This invention aims at eliminating all aforesaid disadvantages and makes it possible for any operator to use the underwater torch without having had any special technical training.

This invention relates to a device made of insulating materials and ordinary metallic materials such as are suitable for underwater cutting and welding of iron, steel plates, pipes, cables, chains, etc., without there being any limitations due to thickness, and using carbon electrodes which are duly pierced for cutting and insulated metallic electrodes for welding. The electric arc is produced by means of electric power.

The aforesaid electric arc brings the material to be cut or welded to melting point temperature and this material is subsequently oxidised by the oxygen jet or welded by melting of the metallic electrode.

This invention is of advantage in all cases of underwater work and, more especially, when it is impossible to use explosives as occurs when underwater demolition is being carried out.

The main feature of this invention is its simple construction and the fact that it is easy to use.

The aforesaid torch for arc-oxygen underwater cutting and welding, according to this invention, is composed of a head, a supporting handle made of insulating material through which a cable passes to the torch connecting the torch to the source of electric power, and to an oxygen supply under pressure. Inside the head there are two jaws joined to the welder by means of a rubber coated electric cable and a connecting piece. These jaws are housed in the head made of insulating material and together with a copper ring and a threaded plug made of insulating material they keep the electrode in position.

These jaws act simultaneously on a cylindrical rubber washer, ensuring oxygen seal. They are, therefore, jaws which keep the electrode in position and guarantee oxygen seal on the electrode.

Obviously there is a valve on the torch to allow for adjusting the oxygen flow.

The carbon electrode may be replaced by a small clamp containing a metallic electrode and said clamp is held tightly with equal pressure by the jaws when the plug is screwed up in the torch.

In order to make this invention clearly understood reference is made to attached drawing in which.

Figure 1:
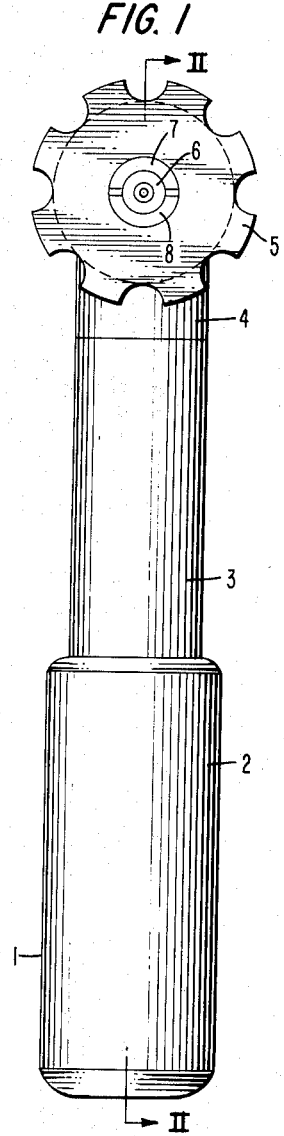
FIG. 1 shows a front view of the torch according to this invention.

The torch consists of a handle 2 into which a threaded duct member 3 is screwed. The head 4 is screwed onto this threaded duct member 3 and a threaded face plug 5 is screwed over the electrode 6 into the front end of the axial bore in the head.

Figure 2:
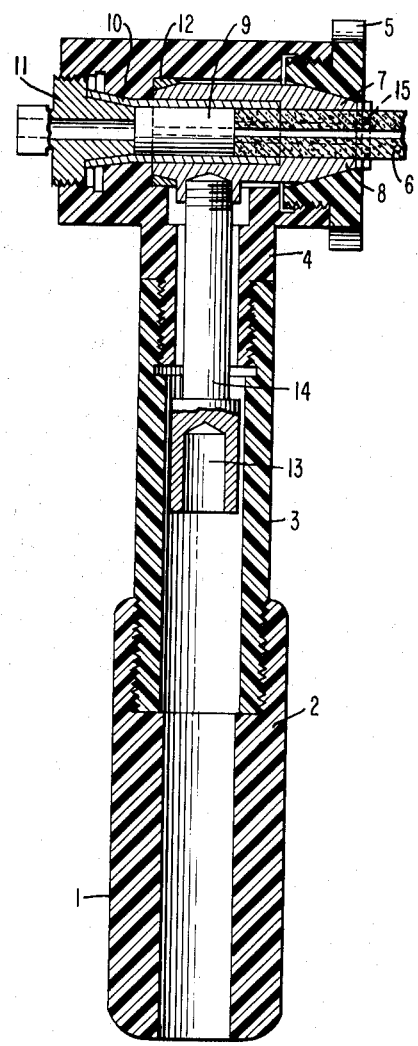
FIG. 2 shows a longitudinal section of the torch along line II—II of FIG. 1.

The head 4 comprises two jaws 7 and 8 which have double taper as is clearly shown in FIGURE 2.

These jaws 7 and 8 hold the electrode 6 tightly with their front parts while for a certain distance they also hold the end of electrode 6, but this is done by means of a cylindrical rubber washer 9.

This rubber washer 9 is in its turn held tightly at its rear portion against the rear inside wall 10 of the bore 4 by a gas connector plug 11 threaded into the back end of the bore. This plug is duly pierced to allow the oxygen to flow through it.

A copper ring 12 is inserted between the two jaws 7 and 8 and the inside wall of the bore. The two jaws 7 and 8 are joined to the welder by means of a rubber coated electric cable 13 and by a threaded connecting piece 14.

From the above description it is easy to see how the assembling of the electrode prior to operation is a very easy job and it is also clear that an oxygen seal is automatically obtained by simply screwing the front plug 5 into the head 4.

It is clear that a normal metallic electrode can be fitted in place of the pierced carbon electrode 6. The normal electrode is not shown in the figures. Replacement is effected by means of a clamp 15 represented by a dotted line in the figure, which clamp contains the electrode.

The plug 5, head 4, duct 3 and handle 2 are all made of insulating material. Rear plug 11 is made of brass. The two jaws 7 and 8 and ring 12 are all made of copper. Cylindrical washer 9 is of rubber. Naturally, all these materials may be replaced by others so long as they are suitable.

Obviously several variations or modifications can be made to this invention by those skilled in the art, without however leaving the spirit and the scope of the invention.

I claim:
1. An oxygen-arc torch having a handle,
An insulating head mounted on said handle and having a bore for receiving an electrode in one end of said bore,
fluid connector means mounted in the other end of said bore,
a metallic chuck surrounding said electrode in said one end of said bore,
clamping means around said chuck for pressing said chuck against said electrode,
a flexible tubular sealing member having one end clamped between said fluid connector means and the wall of said bore and the other end clamped between the inner end of said electrode and said chuck, and
an electric cable passing through said handle and connected to said chuck.
2. An oxygen-arc torch having a handle,
An insulating head mounted on said handle and having a bore receiving an electrode in one end of said bore,
a gas connector plug mounted in the other end of said bore for admitting gas into said bore, a metallic two-part chuck surrounding said electrode in said one end of said bore,
an abutment shoulder in said bore,
said chuck having a bevelled outer end and a bevelled inner end,
a bevelled ring disposed between said abutment shoulder and said bevelled inner end of said chuck,
a bevelled clamping plug threadedly mounted around said outer end of said chuck for pressing said chuck on said electrode,
a flexible tubular sealing member having one end clamped between said gas connector plug and the wall of said bore and the other end clamped between the inner end of said electrode and said chuck,
and an electric cable passing through said handle and connected to said chuck.

3. An oxygen-arc torch according to claim 1 wherein said seal is cylindrical.

4. An oxygen-arc torch according to claim 2, wherein threading of said clamping plug provides electrical contact between said chuck and said electrode and an oxygen seal between said tubular sealing member and said electrode.

References Cited by the Examiner
UNITED STATES PATENTS

| | | | |
|---|---|---|---|
| 2,371,945 | 3/1945 | Barbeck | 219—70 |
| 2,416,278 | 2/1947 | Austin et al. | 219—70 |
| 2,417,650 | 3/1947 | Kandel | 219—70 |
| 2,549,360 | 4/1951 | Barbeck | 219—70 |

RICHARD M. WOOD, *Primary Examiner.*